US012580233B2

(12) United States Patent
Fritz et al.

(10) Patent No.: US 12,580,233 B2
(45) Date of Patent: Mar. 17, 2026

(54) BATTERY SYSTEM AND METHOD FOR OPERATING THE SAME

(71) Applicant: SAMSUNG SDI CO., LTD., Yongin-si (KR)

(72) Inventors: Jürgen Fritz, Graz (AT); Renato Mandic, Graz (AT); Peter Kurcik, Sankt Nikolai im Sausal (AT); Thomas Trathnigg, Graz (AT); Michael Haindl, Hartberg (AT); Pramod Srinivas, Graz (AT)

(73) Assignee: SAMSUNG SDI CO., LTD, Yongin-si (KR)

( * ) Notice: Subject to any disclaimer, the term of this patent is extended or adjusted under 35 U.S.C. 154(b) by 778 days.

(21) Appl. No.: 17/875,271

(22) Filed: Jul. 27, 2022

(65) Prior Publication Data

US 2023/0170538 A1      Jun. 1, 2023

(30) Foreign Application Priority Data

Nov. 30, 2021    (EP) ..................................... 21211236
Feb. 4, 2022    (KR) ........................ 10-2022-0014852

(51) Int. Cl.
H01M 10/42          (2006.01)
B60L 3/00          (2019.01)
H01H 47/00          (2006.01)

(52) U.S. Cl.
CPC ......... H01M 10/425 (2013.01); B60L 3/0046 (2013.01); B60L 3/0084 (2013.01);
(Continued)

(58) Field of Classification Search
CPC ....... H01M 10/425; H01M 2010/4271; H01M 2220/20; H01M 10/42; H01M 10/4207;
(Continued)

(56) References Cited

U.S. PATENT DOCUMENTS 7,489,106 B1      2/2009    Tikhonov
2020/0339009 A1      10/2020    Aschenbrenner et al.
2021/0249872 A1      8/2021    Fritz et al.

FOREIGN PATENT DOCUMENTS

EP          3 863 141 A1      8/2021
KR      10-2018-0041908 A      4/2018
KR      10-2021-0101137 A      8/2021

OTHER PUBLICATIONS

Extended European Search Report issued in corresponding application No. EP 21211236.1, dated May 12, 2022, 8 pages.
(Continued)

*Primary Examiner* — Adam A Arciero
(74) *Attorney, Agent, or Firm* — Womble Bond Dickinson (US) LLP

(57) ABSTRACT

A battery system includes: a battery management system comprising a DC/DC converter and a system basis chip; a microcontroller connected to the system basis chip to receive power from the system basis chip; and a relay driver configured to control a relay. The DC/DC converter receives power from a power source, and the system basis chip receives an output voltage from the DC/DC converter. The relay driver is connected to a node between the system basis chip and the DC/DC converter to receive the output voltage from the DC/DC converter. The microcontroller is electrically connected to the relay driver and is configured to: before switching the relay, control the DC/DC converter to increase the output voltage from a first voltage to a higher second voltage; and control the relay driver to switch the relay while the DC/DC converter outputs the second voltage.

8 Claims, 1 Drawing Sheet

(52) U.S. Cl.
CPC ........ *H01H 47/002* (2013.01); *B60L 2210/10*
(2013.01); *H01M 2010/4271* (2013.01); *H01M 2220/20* (2013.01)

(58) Field of Classification Search
CPC ... H01M 10/44; H01M 10/441; B60L 3/0046;
B60L 3/0084; B60L 3/04; B60L 2210/10;
B60L 58/10; H01H 47/002; Y02T 10/70;
H02J 7/0063; H02J 7/0013; H02J 7/0029;
H02J 7/00309; H02J 7/0068; H02J 2207/20
See application file for complete search history.

(56) References Cited

OTHER PUBLICATIONS

European Notification of the Office Action for Patent Application
No. 21211236.1, dated Aug. 28, 2024, 7 pages.

BATTERY SYSTEM AND METHOD FOR OPERATING THE SAME

CROSS-REFERENCE TO RELATED APPLICATIONS

This application claims priority to and the benefit of European Patent Application No. 21211236.1, filed in the European Patent Office on Nov. 30, 2021, and Korean Patent Application No. 10-2022-0014852, filed in the Korean Intellectual Property Office on Feb. 4, 2022, the entire content of both of which are incorporated herein by reference.

BACKGROUND

1. Field

Aspects of embodiments of the present disclosure relate to a battery system and a method for operating the battery system.

2. Description of the Related Art

Recently, vehicles for transportation of goods and peoples have been developed that use electric power as a source for motion. Such an electric vehicle is an automobile that is propelled by an electric motor using energy stored in rechargeable (or secondary) batteries. An electric vehicle may be solely powered by batteries or may be a hybrid vehicle powered by, for example, a gasoline generator or a hydrogen fuel power cell. Furthermore, the vehicle may include a combination of electric motor and conventional combustion engine. Generally, an electric-vehicle battery (EVB or traction battery) is a battery used to power the propulsion of battery electric vehicles (BEVs). Electric-vehicle batteries differ from starting, lighting, and ignition batteries because they are designed to provide power over sustained periods of time. A rechargeable (or secondary) battery differs from a primary battery in that it is designed to be repeatedly charged and discharged, while the latter is designed to provide only an irreversible conversion of chemical to electrical energy. Low-capacity rechargeable batteries are used as power supply for small electronic devices, such as cellular phones, notebook computers, and camcorders, while high-capacity rechargeable batteries are used as the power supply for electric and hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, for example, cylindrical or rectangular, may be selected based on the battery's intended purpose. Lithium-ion (and similar lithium polymer) batteries, widely known via their use in laptops and consumer electronics, dominate the most recent group of electric vehicle batteries in development.

Rechargeable batteries may be used as a battery module formed of a plurality of unit battery cells coupled to each other in series and/or in parallel to provide high energy content for, as an example, motor driving of a hybrid or electric vehicle. The battery module may be formed by interconnecting the electrode terminals of the plurality of unit battery cells in a configuration (or arrangement) based on a desired amount of power and to realize a high-power rechargeable battery.

Battery modules can be constructed having either a block design or a modular design. In the block design, each battery is coupled to a common current collector structure and a common battery management system, and the unit thereof is arranged in a housing. In the modular design, pluralities of battery cells are connected to each other to form submodules, and several submodules are connected together to form the battery module. In automotive applications, battery systems often consist of a plurality of battery modules connected to each other in series to provide a desired voltage. The battery modules may include submodules with a plurality of stacked battery cells, and each stack may include cells connected in parallel that are, in turn, connected in series (XpYs) or cells connected in series that are, in turn, connected in parallel (XsYp).

A battery pack is a set of any number of (usually identical) battery modules. The battery modules may be configured in series, parallel, or a mixture of both to provide the desired voltage, capacity, and/or power density. Components of the battery packs generally include the individual battery modules and the interconnects, which provide electrical conductivity between the battery modules.

A battery system may further include a battery management system (BMS), which is an electronic system that is configured to manage the rechargeable battery, battery module, and battery pack, such as by protecting the batteries from operating outside their safe operating area (or safe operating parameters), monitoring their states, calculating secondary data, reporting that data, controlling its environment, authenticating it, and/or balancing it. For example, the BMS may monitor the state of the battery as represented by voltage (such as total voltage of the battery pack or battery modules, voltages of individual cells, etc.), temperature (such as average temperature of the battery pack or battery modules, coolant intake temperature, coolant output temperature, temperatures of individual cells, etc.), coolant flow (such as flow rate, cooling liquid pressure, etc.), and current. Additionally, a BMS may calculate values based on the above information, such as minimum and maximum cell voltage, state of charge (SoC), or depth of discharge (DoD) to indicate the charge level of the battery, state of health (SoH, a variously-defined measurement of the remaining capacity of the battery as a % of the original capacity), state of power (SoP, the amount of power available for a defined time interval given the current power usage, temperature, and other conditions), state of safety (SoS), maximum charge current as a charge current limit (CCL), maximum discharge current as a discharge current limit (DCL), and internal impedance of a cell (to determine open circuit voltage).

The BMS may be centralized such that a single controller is connected to the battery cells through a plurality of wires. The BMS may be also distributed with a BMS board installed at each cell and only a single communication cable between the battery and a controller. Or the BMS may have a modular construction including a few controllers, each handling a certain number (e.g., a sub-set) of cells, with communication between the controllers. Centralized BMSs are most economical but are least expandable and are plagued by a relatively large number of wires. Distributed BMSs are the most expensive but are simplest to install and offer the cleanest assembly. Modular BMSs offer a compromise of the features and problems of the other two designs.

A BMS may protect the battery pack from operating outside its safe operating area. Operation outside the safe operating area may be indicated by over-current, over-voltage (e.g., during charging), over-temperature, under-temperature, over-pressure, and ground fault or leakage current detection. The BMS may prevent operation outside the battery's safe operating area by including an internal switch, such as a relay or solid-state device, which opens if the battery is operated outside its safe operating area, requesting the devices to which the battery is connected to reduce or even terminate using the battery, and actively controlling the environment, such as through heaters, fans, air conditioning, or liquid cooling.

A static control of battery power output and charging may not be sufficient to meet the dynamic power demands of various electrical consumers connected to the battery system. In such a case, steady exchange of information between the battery system and the controllers of the electrical consumers may be provided and/or utilized. Such information includes the battery systems actual state of charge (SoC), potential electrical performance, charging ability, and internal resistance as well as actual or predicted power demands or surpluses of the consumers. Therefore, battery systems usually include a battery management system (BMS) for obtaining and processing such information on a system level and further include a plurality of battery module managers (BMMs), which are part of the system's battery modules and obtain and process relevant information on a module level. For example, the BMS usually measures the system voltage, the system current, the local temperature at different places inside the system housing, and the insulation resistance between live components and the system housing, and the BMMs usually measure the individual cell voltages and temperatures of the battery cells in a battery module.

Thus, the BMS/BMU manages the battery pack, such as by protecting the battery from operating outside its safe operating area, monitoring its state, calculating secondary data, reporting that data, controlling its environment, authenticating it, and/or balancing it.

In the event of an abnormal operation state, a battery pack should usually be disconnected from a load connected to a terminal of the battery pack. Therefore, battery systems may further include a battery disconnect unit (BDU) that is electrically connected between the battery module and battery system terminals. The BDU is the primary interface between the battery pack and the electrical system of the load (e.g., the vehicle). The BDU may include electromechanical switches that open or close high current paths between the battery pack and the electrical system. The BDU provides feedback to a battery control unit (BCU), which accompanies the battery modules, such as voltage and current measurements. The BCU controls the switches in the BDU by using low current paths based on the feedback received from the BDU. The main (or primary) functions of the BDU may include controlling current flow between the battery pack and the electrical system and current sensing. The BDU may further manage additional functions, such as external charging and pre-charging.

There are several concepts for powering the BMS and its high power/voltage relays in vehicle applications (e.g., in xEV applications) and also for stationary storage systems (ESS).

The BMS may, for example, be directly supplied by 12V or 24V by using a DC/DC converter and a microcontroller with a local 5V/3.3V supply. Relays are either controlled by a pulse width modulation (PWM) controller for optimized power consumption or by a constant voltage supply.

In other examples, a dedicated system basis chip (SBC) may be used to supply the microcontroller with local 5V/3.3V supply. In other cases, the BMS may be directly supplied by 12V or 24V but with buck/boost converter that generates constant 12V for relays and other power consumers of (or in) the BMS (e.g., a system basis chip (SBC), a microcontroller (MCU), and other components). In another example, a stationary ESS system typically has a constant industrial 24V power supply. In such applications, high power relays are used, which are powered directly with such 24V supply voltage. In all of these cases, however, the relay is either controlled by a PWM controller or is supplied with constant supply voltage.

Generally, if PWM or a constant voltage is used for the relay control, substantial heat is generated inside the relays. These relays are, at least temporarily, on the edge of their maximum self-heating caused by the external supply current and ambient temperature profiles. Accordingly, a PWM control has to be used to reduce or minimize self-heating caused by the current through the coil because otherwise a larger relay would have to be selected, which would increase the overall costs significantly. A PWM control, on the other hand, makes the relay drivers more complex and more expensive. Further, additional measures for establishing electromagnetic compatibility (EMC) are needed in such a case. Without such PWM control, a certain power is unnecessarily converted into heat inside the relays. Further, in addition to the above, a BMS for a stationary ESS system was always a different PCB than a BMS for a xEV battery pack.

SUMMARY

The present disclosure is defined by the appended claims and their equivalents. Any disclosure lying outside this scope is intended for illustrative as well as comparative purposes.

A battery system needs to be developed that overcomes at least some of the deficiencies explained above, such as by having reduced power consumption to reduce unnecessary heat generation and less costs involved.

According to one embodiment of the present disclosure, a battery system is provided. The battery system includes a power source and a battery management system. The battery management system includes a DC/DC converter and a system basis chip (SBC). The DC/DC converter is electrically connected to the power source to receive power from the power source and is configured to output an output voltage. Further, the SBC is electrically connected in series with the DC/DC converter to receive the output voltage from the DC/DC converter. A microcontroller is connected to the SBC to receive power from the SBC, and a relay driver is configured to control a relay. The relay driver is connected to an output node of the DC/DC converter, which is interconnected between the SBC and the DC/DC converter. The microcontroller is electrically connected to the relay driver and is configured to, before switching the relay, control the DC/DC converter to increase the output voltage from a first voltage to a second voltage that is higher than the first voltage and to control the relay driver to switch the relay while the second voltage is outputted by the DC/DC converter.

In other embodiments of the present disclosure, a vehicle and a stationary energy storage system comprising the battery system are provided. Thus, the present disclosure is also applicable to stationary systems.

According to another embodiment of the present disclosure, a method for operating an battery system according to an embodiment is provided. The method includes the step of, before switching the relay, controlling, by the microcontroller, the DC/DC converter to increase the output voltage from a first voltage to a second voltage that is higher than the first voltage. The method further includes the step of controlling the relay driver, by the microcontroller, to switch the at least one relay while the second voltage is outputted by the DC/DC converter.

Further aspects and features of the present disclosure can be learned from the dependent claims or the following description.

BRIEF DESCRIPTION OF THE DRAWINGS

Aspects and features of the present disclosure will become apparent to those of ordinary skill in the art by describing, in detail, embodiments thereof with reference to the attached drawings in which.

DETAILED DESCRIPTION

Figures 1, 2:
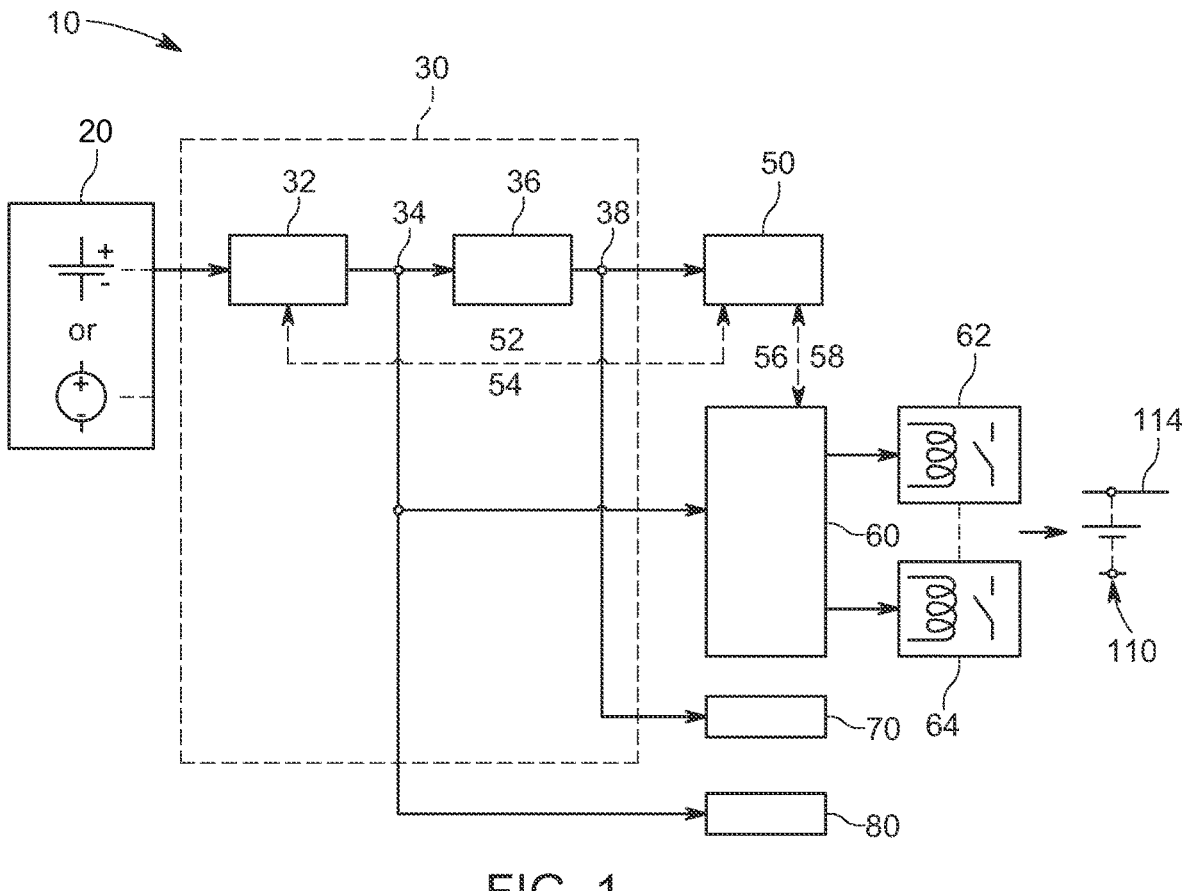
FIG. 1 illustrates a battery system according to an embodiment of the present disclosure.
FIG. 2 illustrates a method for operating the battery system according to an embodiment of the present disclosure.

Reference will now be made, in detail, to embodiments, examples of which are illustrated in the accompanying drawings. Aspects and features of the embodiments, and implementation methods thereof, will be described with reference to the accompanying drawings. In the drawings, like reference numerals denote like elements, and redundant descriptions may be omitted. The present disclosure, however, may be embodied in various different forms and should not be construed as being limited to the embodiments illustrated herein. Rather, these embodiments are provided as examples so that this disclosure will be thorough and complete and will fully convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise.

It will be further understood that the terms "have," "include," and "comprise," and variations thereof, such as "having," "including," "comprising," etc., specify a property, a region, a fixed number, a step, a process, an element, a component, and/or a combination thereof but do not exclude other properties, regions, fixed numbers, steps, processes, elements, components, and/or combinations thereof.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. Further, the various components of these devices may be implemented on a flexible printed circuit film, a tape carrier package (TCP), a printed circuit board (PCB), or formed on one substrate. The electrical connections or interconnections described herein may be realized by wires or conducting elements (e.g., on a PCB or another kind of circuit carrier). The conducting elements may include metallization, such as surface metallizations and/or pins, and/or may include conductive polymers or ceramics. Further, electrical energy might be transmitted via wireless connections by, for example, using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory, which may be implemented in a computing device by using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

According to one embodiment of the present disclosure, a battery system is provided. The battery system includes a power source and a battery management system including a DC/DC converter and a system basis chip (SBC). The DC/DC converter is electrically connected to the power source to receive power from the power source and is configured to output an output voltage. The SBC is electrically connected in series with the DC/DC converter to receive the output voltage from the DC/DC converter. A microcontroller is connected to the SBC to receive power from the SBC, and a relay driver is configured to control at least one relay. The relay driver is connected to an output node of the DC/DC converter, which is interconnected between the SBC and the DC/DC converter. The microcontroller is electrically connected to the relay driver and is configured to, before switching the at least one relay, control the DC/DC converter to increase the output voltage from a first voltage to a second voltage that is higher than the first voltage and to control the relay driver to switch the at least one relay while the second voltage is outputted by the DC/DC converter.

A system basis chip (SBC) is an integrated circuit that is configured to supply several consumers with various supply voltages according to their power need. For example, the SBC can provide the microcontroller with stable operating voltage between 3.3V or 5V. The microcontroller may also have different voltage supply levels, for example, within the cited range. The SBC is very robust with respect to variations in voltage input, such that the SBC can stably function despite an increase in output voltage of the DC/DC converter during switching. The properties of the BMS can be inferred from the introduction. The DC/DC converter and the SBC together form a power supply on the BMS. The DC/DC converter and the SBC are integrated on a printed circuit board. The power source may be an external power source, for example, a board net voltage originating from a battery providing, for example, 12V or 24V. The power source may be a constant (e.g., regulated) DC supply providing, for example, 24V. The DC/DC converter includes a buck and/or boost functionality such that the output voltage of the DC/DC converter is tunable at least between two voltages. The microcontroller typically requires 3.3V or 5V. The relays may be configured to switch a terminal voltage of a battery and/or battery pack. The switching may include a closing and/or an opening operation. Before switching the at least one relay may be that the microcontroller identifies that a switching of the at least one relay needs to be performed.

The switching operation of the at least one relay, according to embodiments of the present disclosure, uses a higher supply voltage, but the higher supply voltage is not required for holding or keeping a distinct relay state. Before the switching operation is performed, the output voltage is therefore increased. A PWM modulation controller may be omitted (or is not required), and an unnecessarily high voltage supply is circumvented, thereby reducing costs and power consumption. Furthermore, because the system basis chip (SBC) is robust with respect to changes in input voltage, it can still function during a switching operation. Thus, the supply of higher voltage to the relay driver is based on whether there is an actual switching operation, which leads to reduced power consumption and reduced self-heating, because before switching the relay, a lower voltage is supplied this supply voltage is only increased for (e.g., for the duration of) the switching operation. Further, relay driver design is less complex compared to PWM and without consideration for EMC measures.

The microcontroller may be configured to control the DC/DC converter to output the second voltage until the at least one relay is switched and to control the DC/DC converter to reduce the output voltage from the second voltage to the first voltage in response to when the switching of the at least one relay is completed. Thus, only a transient/temporary increase of the voltage is generated and the first voltage, which is lower than the second voltage, is supplied again as soon as the switching operation is completed. Thus, reduced effective power consumption and heating is achieved.

The battery system may further include at least one additional power consumer, which is electrically connected to an output node of the SBC to receive the output voltage from the SBC. These power consumers are not affected by the temporary voltage increase because the SBC provides a robust voltage output despite of variations in the DC/DC output during switching.

The first voltage may be lower than a minimum voltage required to switch the at least one relay. In this case, the power consumption is reduced because the supply voltage is a reduced voltage for most times apart from the transient time window(s) in which the switching operation is performed.

The first voltage may be lower than a minimum voltage required to switch the at least one relay. Thereby, power consumption is reduced because in operating times other than when the switching occurs (e.g., where the relays are kept open or closed), the power supply is reduced. Thus, any self-heating is reduced or minimized.

The second voltage may be equal to or higher than a minimum voltage required to switch the at least one relay. The second voltage may be set to be close to the minimum voltage required to switch the at least one relay to reduce power consumption. A second voltage, for example, may be between about 10V and about 12V.

The first voltage may be equal or higher than a minimum operating voltage of the microcontroller. The first voltage may guarantee that the microcontroller can still be sufficiently supplied and that the SBC is still working (e.g., is still operational). For example, a first voltage may be between about 6V and about 8V.

According to another embodiment, a vehicle may include the battery system. According to another embodiment, a stationary energy storage system may include the battery system.

According to another embodiment, a method for operating the battery system includes the step of: before switching the at least one relay, controlling, by the microcontroller, the DC/DC converter to increase the output voltage from a first voltage to a second voltage that is higher than the first voltage. In a further step, the method includes controlling the relay driver, by the microcontroller, to switch the at least one relay while the second voltage is outputted by the DC/DC converter.

The method may further include controlling, by the microcontroller, the DC/DC converter to output the second voltage until the at least one relay is switched. Further, the method may include controlling, by the microcontroller, the DC/DC converter to reduce the output voltage from the second voltage to the first voltage in response to completion of the switching of the at least one relay. Thus, only a transient/temporary increase of the voltage is generated, and the first voltage, which is lower than the second voltage, is supplied again as soon as the switching operation is completed. Thus, effective power consumption is reduced.

FIG. 1 illustrates a battery system 10 according to an embodiment of the present disclosure.

The battery system 10 includes a battery management system (BMS) 30. The BMS 30 includes a DC/DC converter 32 and a system basis chip (SBC) 36. The DC/DC converter 32 and the SBC 36 together form a power supply in the BMS 30 to supply power to the various power consumers 50, 70, 80 as explained below. The DC/DC converter 32 and the SBC 36 may be integrated on one circuit board.

The DC/DC converter 32 is electrically connected to a power source 20 to receive power from the power source 20. The power source 20 may be, for example, a board net voltage providing a voltage of about 12V or about 24V as an input voltage to the DC/DC converter 32. The board net voltage may be generated by a battery, for example, a lead-acid battery. When a battery with a 24V output is used as the power source 20, voltage fluctuations with voltage peaks up to about 60V can occur, such that the DC/DC converter 32 is needed. In other examples, the power source 20 may be a constant (e.g., regulated) DC supply providing, for example, 24V, but the present disclosure is not restricted thereto.

The DC/DC converter 32 is configured to convert an input voltage that is input to the DC/DC converter 32 to an output voltage. For example, the DC/DC converter 32 can be controlled by a microcontroller 50 to output at least two different output voltages as explained in more detail below. The DC/DC converter 32 includes a controllable buck and/or boost functionality. This controllable buck and/or boost functionality can be controlled by the microcontroller 50 through a control line 52. Further, a diagnosis line 54 may be provided to transmit signals indicative of the operation state of the DC/DC converter 32 to the microcontroller 50.

The SBC 36 is electrically connected in series with the DC/DC converter 32 to receive the output voltage from the DC/DC converter 32. Therefore, the output voltage is a power supply for the SBC 36. The SBC 36 supplies various power consumers 50, 70 with a stable power supply based on the power needs of the particular power consumer 50, 70.

The microcontroller 50 is connected to the SBC 36 to receive power from the SBC 36. The SBC 36 may provide (e.g., may output) a power between 3.3V and 5V to the microcontroller 50. Thus, the microcontroller 50 is operable due to the stable supply from the SBC 36.

The battery system 10 further includes a relay driver 60. The relay driver 60 is configured to control at least one relay 62, 64 to perform a switching operation. Two relays 62, 64 are shown in the illustrated embodiment, but the present disclosure is not restricted thereto. The switching operation may be switching of a terminal voltage of a battery 110 or battery pack, for example, to set a corresponding power line 114 non-conductive or conductive. However, other switching operations may be performed by the relay driver 60.

The relay driver 60 is connected to an output node 34 of the DC/DC converter 32. The output node 34 is interconnected between the SBC 36 and the DC/DC converter 32 to receive the output voltage from the DC/DC converter 32. The output voltage of the DC/DC converter 32 is a power supply for the relay driver 60.

The microcontroller 50 is electrically connected to the relay driver 60 through a control line 56 to control the relay driver 60 by control signals transmitted to the relay driver 60. The relay driver 60 may also transmit diagnosis signals through a diagnostic line 58 to transmit state information to the microcontroller 50.

The microcontroller 50 is also electrically connected to the DC/DC converter 32 via the control line 52. Therefore, the microcontroller 50, through the control line 52, controls the DC/DC converter 32 as explained in more detail below.

The microcontroller 50 may identify (or determine) that the at least one relay 62, 64 needs to be switched. For example, the microcontroller 50 may receive an external signal from, for example, a vehicle control, indicating that the at least one relay 62, 64 needs to be switched. In other examples, the microcontroller 50 may identify, based on received state signals obtained from a monitoring unit (e.g., various sensors that supervise operation-relevant parameters of the battery), to switch the at least one relay 62, 64.

Before a switching operation is performed, the microcontroller 50 controls, through the control line 52, the DC/DC converter 32 to increase the output voltage of the DC/DC converter 32. For example, the microcontroller 50 controls the DC/DC converter 32 to increase the output voltage from a first voltage V1 to a second voltage V2 that is higher than the first voltage V1. This is schematically illustrated in FIG. 2. Then, instead of the first voltage V1, the second voltage V2 is supplied to the output node 34 and, therefore, also to the relay driver 60.

The microcontroller 50 is configured to control the relay driver 60, through control line 56, to switch the at least one relay 62, 64 while the second voltage V2 is outputted by the DC/DC converter 32. The microcontroller 50 may, for example, receive a diagnostic signal through diagnostic line 58 indicative of the relay driver 60 receiving the second voltage V2. Therefore, higher power is provided to the relay driver 60 to perform the switching operation compared to the power provided at times when no switching operation is performed (e.g., when the at least one relay 62, 64 is held closed or held open).

The microcontroller 50 further controls the DC/DC converter 32 to output the second voltage V2 until the at least one relay 62, 64 is switched. Here, the microcontroller 50 may, for example, receive a diagnostic signal through the diagnostic line 58 indicative of the at least one relay 62, 64 being switched (e.g., that the switching operation is completed).

Then, after the switching operation is completed, the microcontroller 50 controls the DC/DC converter 32 to reduce the output voltage from the second voltage V2 to the first voltage V1. Thus, the increase of the output voltage is transient/temporary such that the time of increased power is relatively short, and thus, an effective reduction of power consumption and self-heating is achieved without the use of a PWM controller.

The first and second voltages V1, V2 may be set to reduce the power consumption. For example, the first voltage V1 may be lower than a minimum voltage required to switch the at least one relay 62, 64. Additionally, the second voltage V2 may be equal to or higher than a minimum voltage required to switch the at least one relay 62, 64. For example, the first voltage V1 may be equal to or higher than a minimum operating voltage for the SBC 36 and also for the microcontroller 50. Thus, PWM control is rendered obsolete and a PWM control may be omitted.

For example, a second voltage V2 may be between about 10V and about 12V, and a first voltage V1 may be between about 6V and about 8V. When the first voltage V1 is within this range, the SBC 36 still receives sufficient power to be operable. Further, this amount of power is also sufficient to stably supply the microcontroller 50, which generally requires between about 3.3V and about 5V. In addition, the second voltage V2 is sufficient for the relay driver 60 to operate (e.g., to switch) the at least one relays 62, 64.

Further, several additional power consumers 70, 80 can be integrated and provided with power through either the DC/DC converter 32 or the SBC 36. In one embodiment, a first power consumer 70 is electrically connected to an output node 38 of the SBC 36 to receive the output voltage from the SBC 36. As described above, the SBC 36 can stably output a voltage despite the transient output voltage increase of the DC/DC converter 32 during switching.

Further, a second power consumer 80 can be connected to the output node 34 of the DC/DC converter 32. In such an embodiment, the second power consumer 80 may be configured to be robust with respect to the transient voltage increase during switching operation times.

In another embodiment, a power consumer may be directly connected to the power source 20 but has to be configured to be operable when using the unregulated voltage from the power source 20.

In FIG. 2, a method for operating the battery system 10 is schematically shown in terms of a time diagram. The method is performed by a battery system 10 according to one of the above-described embodiments.

Initially, a first voltage V1 is supplied to the relay driver 60. In this time, the at least one relay 62, 64 is held in a closed state or an open state by the relay driver 60. For example, the first voltage V1 may be between about 6V and about 8V. This first voltage V1 may be sufficient for the relay driver 60 to hold/keep the at least one relay 62, 64 closed or opened. For example, the first voltage V1 can be lower than a minimum voltage required to switch the at least one relay 62, 64 to reduce power consumption during times in which no switching operation is performed. The first voltage V1 may be set so that the SBC 36 receives sufficient power to be operable. For example, the first voltage V1 is set such that the SBC 36 stably supplies the microcontroller 50 and/or other components. The first voltage V1 can be equal or higher than a minimum operating voltage of the microcontroller 50.

The microcontroller 50 may identify that the at least one relay 62, 64 needs to be switched. Before switching the at least one relay 62, 64, the DC/DC converter 32 is controlled by the microcontroller 50 to increase the output voltage from a first voltage V1 to a second voltage V2 that higher than the first voltage V1 (S100). The second voltage V2 can be equal or higher than a minimum voltage required to switch the at least one relay 62, 64. For example, a second voltage V2 may be between about 10V and about 12V.

In a further step, the relay driver 60 is controlled by the microcontroller 50 to switch the at least one relay 62, 64 while the second voltage V2 is outputted by the DC/DC converter 32 (S110). The switching may occur after confirming, for example, through the diagnostic line 58, that the relay driver 60 is receiving the second voltage V2.

In a further step, the DC/DC converter 32 is controlled by the microcontroller 50 to output the second voltage V2 until the at least one relay 62, 64 is switched. Further, the DC/DC converter 32 is controlled by the microcontroller 50 to reduce the output voltage from the second voltage V2 to the first voltage V1 in response to when the switching of the at least one relay 62, 64 is completed (S120). Also, a confirming diagnostic signal indicative of switching completion may be transmitted through the diagnostic line 58 to the microcontroller 50. This method and the battery system, according to embodiments of the present disclosure, provide reduced power consumption and reduced self-heating because before switching the relay a lower voltage is supplied and the supply voltage is increased only for the switching operation. Further, relay driver design is less complex compared to PWM and no EMC measures need to be provided.

SOME REFERENCE NUMERALS

10 battery system
20 power source
30 battery management system (BMS)
32 DC/DC converter
34 output node
36 system basis chip (SBC)
38 output node
50 microcontroller
52 control line
54 diagnosis line
56 control line
58 diagnosis line
60 relay driver
62 relay
64 relay
70 first power consumer
80 second power consumer
110 battery/battery pack
114 power line
S100 increase output voltage
S110 switch the at least one relay
S120 reduce output voltage

What is claimed is:

1. A battery system comprising:
a power source;
a battery management system comprising a DC/DC converter and a system basis chip, the DC/DC converter being electrically connected to the power source to receive power from the power source and configured to output an output voltage, the system basis chip being electrically connected in series with the DC/DC converter to receive the output voltage from the DC/DC converter;
a microcontroller connected to the system basis chip to receive power from the system basis chip; and
a relay driver configured to control a relay, the relay driver being connected to an output node of the DC/DC converter, the output node being interconnected between the system basis chip and the DC/DC converter to receive the output voltage from the DC/DC converter,
wherein the microcontroller is electrically connected to the relay driver and is programmed to:
before switching the relay, control the DC/DC converter to increase the output voltage from a first voltage to a second voltage, the second voltage being higher than the first voltage;
control the relay driver to switch the relay while the DC/DC converter outputs the second voltage;
control the DC/DC converter to output the second voltage until the relay is switched; and
control the DC/DC converter to reduce the output voltage from the second voltage to the first voltage in response to the switching of the relay being completed.

2. The battery system of claim 1, further comprising a power consumer that is electrically connected to an output node of the system basis chip to receive the output voltage from the system basis chip.

3. The battery system of claim 1, wherein the first voltage is lower than a minimum voltage required to switch the relay.

4. The battery system of claim 3, wherein the second voltage is equal to or higher than the minimum voltage required to switch the relay.

5. The battery system of claim 4, wherein the first voltage is equal to or higher than a minimum operating voltage of the microcontroller.

6. A vehicle comprising the battery system of claim 5.

7. A stationary energy storage system comprising the battery system of claim 5.

8. A method for operating the battery system according to claim 1, the method comprising:

before switching the relay, controlling the DC/DC converter, by the microcontroller, to increase the output voltage from the first voltage to the second voltage;

controlling the relay driver, by the microcontroller, to switch the relay while the DC/DC converter outputs the second voltage;

controlling the DC/DC converter, by the microcontroller, to output the second voltage until the relay is switched; and controlling the DC/DC converter, by the microcontroller, to reduce the output voltage from the second voltage to the first voltage in response to the switching of the relay being completed.

\* \* \* \* \*